(12) United States Patent
Hoshina et al.

(10) Patent No.: US 9,676,974 B2
(45) Date of Patent: Jun. 13, 2017

(54) HYDROGENATED BLOCK COPOLYMER PELLET, ADHESIVE COMPOSITION, AND SURFACE PROTECTION FILM

(71) Applicant: Asahi Kasei Kabushiki Kaisha, Tokyo (JP)

(72) Inventors: Toshikazu Hoshina, Tokyo (JP); Yasuhiro Kusanose, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/107,610

(22) PCT Filed: Dec. 17, 2014

(86) PCT No.: PCT/JP2014/083463
§ 371 (c)(1),
(2) Date: Jun. 23, 2016

(87) PCT Pub. No.: WO2015/098664
PCT Pub. Date: Jul. 2, 2015

(65) Prior Publication Data
US 2016/0326412 A1   Nov. 10, 2016

(30) Foreign Application Priority Data
Dec. 24, 2013  (JP) ................ 2013-265994

(51) Int. Cl.
| | | |
|---|---|---|
| *C09J 153/02* | (2006.01) | |
| *C08F 297/04* | (2006.01) | |
| *C09J 7/02* | (2006.01) | |
| *C08L 23/04* | (2006.01) | |
| *C08L 53/02* | (2006.01) | |

(52) U.S. Cl.
CPC ........ *C09J 153/025* (2013.01); *C08F 297/04* (2013.01); *C08L 23/04* (2013.01); *C08L 53/025* (2013.01); *C09J 7/02* (2013.01); *C09J 7/0228* (2013.01); *C08L 2203/16* (2013.01); *C08L 2205/03* (2013.01); *C08L 2205/14* (2013.01); *C08L 2207/04* (2013.01); *C09J 2205/114* (2013.01); *C09J 2453/005* (2013.01)

(58) Field of Classification Search
CPC ........ C09J 153/025; C09J 7/02; C09J 7/0228; C09J 2205/114; C09J 2453/005; C08F 297/04; C08L 23/04; C08L 53/025; C08L 2203/16; C08L 2205/03; C08L 2205/14; C08L 2207/04; Y10T 428/2982
USPC ...................................................... 428/403
See application file for complete search history.

(56) References Cited

U.S. PATENT DOCUMENTS 6,399,696 B1 *  6/2002  Toyosawa ............... C08K 5/01
                                                              524/474
2015/0344684 A1   12/2015  Kusanose et al.

FOREIGN PATENT DOCUMENTS

| EP | 2865717 A1 | 4/2015 |
|---|---|---|
| JP | 5-98051 | * 4/1993 |
| JP | H05-098051 A | 4/1993 |
| JP | H08-225775 A | 9/1996 |
| JP | H08-302151 A | 11/1996 |
| JP | 2000-198968 A | 7/2000 |
| JP | 2000-238066 | * 9/2000 |
| JP | 2000-248244 A | 9/2000 |
| JP | 2001-64445 | * 3/2001 |
| JP | 2001-064445 A | 3/2001 |
| JP | 2002-167567 A | 6/2002 |
| JP | 2002-371136 A | 12/2002 |
| JP | 2002-3711136 | * 12/2002 |
| JP | 2007-126569 | * 5/2007 |
| JP | 2007-126569 A | 5/2007 |
| JP | 2008-111097 A | 5/2008 |
| JP | 2010-77339 | * 4/2010 |
| JP | 2010-077339 A | 4/2010 |
| JP | 2014-034625 A | 2/2014 |
| TW | 201341459 A | 10/2013 |
| WO | 2014/002984 A | 1/2014 |
| WO | WO2014/002984 | * 1/2014 |

OTHER PUBLICATIONS

International Search Report issued in corresponding International Patent Application No. PCT/JP2014/083463 dated Mar. 24, 2015.
International Preliminary Report on Patentability and Written Opinion issued in corresponding International Patent Application No. PCT/JP2014/083463 dated Jun. 28, 2016.
European Search Report issued in counterpart European Patent Application No. 14875422.9 dated Nov. 11, 2016.

* cited by examiner

*Primary Examiner* — Leszek Kiliman
(74) *Attorney, Agent, or Firm* — Morgan, Lewis & Bockius LLP

(57) ABSTRACT

A hydrogenated block copolymer pellet having:
  100 parts by mass of a pellet molded product of hydrogenated block copolymer A and
  0.01 to 1.5 parts by mass of an antiblocking agent of polyethylene-based powder B, wherein
  the hydrogenated block copolymer A has a polymeric block a mainly having at least one vinyl aromatic monomer unit and polymeric block b mainly having at least one conjugated diene monomer unit, in which
  a total content of the 1,2-bond content and the 3,4-bond content in the hydrogenated block copolymer A before hydrogenation is less than 40 mol %, based on the total binding amount of the conjugated diene monomer unit.

23 Claims, No Drawings

HYDROGENATED BLOCK COPOLYMER PELLET, ADHESIVE COMPOSITION, AND SURFACE PROTECTION FILM

TECHNICAL FIELD

The present invention relates to a hydrogenated block copolymer pellet, an adhesive composition, and a surface protection film.

BACKGROUND ART

A surface protection film is used for the purpose of protecting the surface of a prism sheet or the like, which is used for synthetic resin plates or stainless-steel plates used as building materials, aluminum plates, decorative plywood, steel plates, glass plates, furniture, household goods, home appliances, precision machines and automobiles, and also for optical applications, from scratch, dust, and stain.

As an adhesive used for the adhesive layer of such a surface protection film, an acrylic adhesive, and a rubber adhesive mainly comprising rubber such as natural rubber and polyisobutylene, have been conventionally used. As a method of applying such an adhesive to a predetermined supporting film, a method of applying an adhesive solution prepared by dissolving an adhesive in a solvent to the film, using a roll, a spray, etc., has been used. Such a method is advantageous in that an adhesive layer can be uniformly and thinly applied to the supporting film. However, from the viewpoint of air pollution, fire, industrial safety and health upon production, economic efficiency and the like, the use of a solvent is not preferable.

For such a reason, recently, a co-extrusion film formed by integrating a base material layer made of a polyolefinic resin with an adhesive layer comprising a hydrogenated styrene elastomer or olefinic elastomer has been preferably used.

These surface protection films have the following some required characteristics. For example, the surface protection film is required not to cause the floating or peeling thereof easily, when the adherend product thereof is stored or transported. In addition, the surface protection film is also required such that a user can easily peel the film from the adherend with a small power, namely, the tack strength of the adhesive layer is not increased (tackiness is not increased) by factors such as the time and temperature applied to the storing of the surface protection film.

Moreover, the surface protection film is also required not to contaminate the surface of the adherend, namely, a portion of the adhesive layer, or low-molecular-weight compounds such as antioxidants or powders (outer lubricants), which are comprised in the adhesive layer, when the surface protection film peal, do not migrate to the surface of the adherend. This property is particularly important in a case where the adherend is an optical member.

Furthermore, the surface protection film is generally produced and stored in the form of a roll, and it is fed before use. It is also important for the surface protection film that only a small power is needed for this feeding, namely, to have high release property.

For the purpose of satisfying the above described required characteristics, various studies and proposals have been conducted. For example, there has been proposed a surface protection film, which comprises an adhesive layer containing a styrene elastomer and a tackifier, and a base material layer adjacent to the adhesive layer, containing an olefinic elastomer with a specific structure (see, for example, Patent Literature 1).

Moreover, a large number of surface protection films, each of which has an adhesive layer containing a hydrogenated styrene elastomer with a specific structure and a base material layer consisting of a thermoplastic resin, have been proposed (see, for example, Patent Literature 2, 3, and 4).

CITATION LIST

Patent Literature

Patent Literature 1: Japanese Patent Laid-Open No. 2008-111097
Patent Literature 2: Japanese Patent Laid-Open No. 2002-167567
Patent Literature 3: Japanese Patent Laid-Open No. 2000-248244
Patent Literature 4: Japanese Patent Laid-Open No. 2000-198968

SUMMARY OF INVENTION

Technical Problem

However, when the base material layer of the surface protection film described in each of Patent Literatures 1 to 4 is a polyolefinic resin, the release property thereof is insufficient because the affinity between the base material layer and the adhesive layer is high.

Furthermore, the surface protection film described in each of Patent Literatures 1 to 4 is problematic in that it easily contaminates the surface of the adherend. In particular, since conditions for a contamination promotion test to optical members have recently covered a high temperature region of over 60° C., there is a concern that powders adhering to hydrogenated styrene elastomer pellets would transfer to the surface of the adherend.

For the purpose of preventing blocking among the pellets of the hydrogenated styrene elastomer, the powders are allowed to adhere to the surface of the pellets at the stage of production of the pellets. In general, as such powders, calcium stearate, ethylene bis-stearyl amide (EBS) or the like is most effective and is commonly used. In order not to contaminate the surface of the adherend even under high temperature exposure conditions, these compounds need to be eliminated as much as possible.

The present invention has been made to solve the aforementioned problems, and it is an object of the present invention to provide: hydrogenated block copolymer pellets, which can prevent blocking among the pellets, and which can form an adhesive layer that exhibits appropriately high tack strength to an adherend, has small tackiness enhancing, is excellent in film-release property after the film has been preserved in a roll state, and does not contaminate the surface of the adherend even after it is exposed to high temperature conditions; an adhesive resin composition comprising the hydrogenated block copolymer pellets; and a surface protection film having an adhesive layer comprising the adhesive resin composition.

Solution to Problem

As a result of intensive studies directed towards achieving the aforementioned object, the present inventors have found that the object can be achieved by dusting predetermined polyethylene-based powders over predetermined hydrogenated block copolymer pellets, thereby completing the present invention.

Specifically, the present invention is as follows.

[1]

A hydrogenated block copolymer pellet comprising:

100 parts by mass of a pellet molded product of hydrogenated block copolymer A and 0.01 to 1.5 parts by mass of an antiblocking agent of polyethylene-based powder B, wherein the hydrogenated block copolymer A has a polymeric block a mainly comprising at least one vinyl aromatic monomer unit and polymeric block b mainly comprising at least one conjugated diene monomer unit, in which a total content of the 1,2-bond content and the 3,4-bond content in the hydrogenated block copolymer A before hydrogenation is less than 40 mol %, based on a total binding amount of the conjugated diene monomer unit, a content of the polymeric block a in the hydrogenated block copolymer A is 5% to 30% by mass, the polyethylene-based powder B has a number average molecular weight of 15,000 or less, and the antiblocking agent of polyethylene-based powder B have an average particle diameter of 1 to 15 μm.

[2]

A hydrogenated block copolymer pellet comprising:

100 parts by mass of a pellet molded product of hydrogenated block copolymer A and 0.01 to 1.5 parts by mass of an antiblocking agent of polyethylene-based powder B, wherein the hydrogenated block copolymer A has a polymeric block a mainly comprising at least one vinyl aromatic monomer unit and polymeric block b mainly comprising at least one conjugated diene monomer unit, in which the hydrogenated block copolymer A has a Tg of −30° C. to −45° C., a content of the polymeric block a in the hydrogenated block copolymer A is 5% to 30% by mass, the polyethylene-based powder B has a number average molecular weight of 15,000 or less, and the antiblocking agent of polyethylene-based powder B have an average particle diameter of 1 to 15 μm.

[3]

The hydrogenated block copolymer pellet according to the above [1] or [2], wherein the hydrogenated block copolymer A has a hardness (JIS-A) of 30° to 80°.

[4]

The hydrogenated block copolymer pellet according to any one of the above [1] to [3], wherein the antiblocking agent of polyethylene-based powder B have an angle of repose of 45° to 70°.

[5]

The hydrogenated block copolymer pellet according to any one of the above [1] to [4], wherein the antiblocking agent of polyethylene-based powder B adhere to the surface of the pellet molded product of the hydrogenated block copolymer A.

[6]

The hydrogenated block copolymer pellet according to any one of the above [1] to [5], wherein the polyethylene-based powder B has a melting point of 110° C. or higher.

[7]

The hydrogenated block copolymer pellet according to any one of the above [1] to [6], wherein the hydrogenation ratio of an olefinic unsaturated double bond in the hydrogenated block copolymer A is 50 mol % or more.

[8]

The hydrogenated block copolymer pellet according to any one of the above [1] to [7], wherein the vinyl aromatic monomer unit comprises a styrene unit, and the conjugated diene monomer unit comprises a butadiene unit.

[9]

The hydrogenated block copolymer pellet according to any one of the above [1] to [8], wherein the content of the polymeric block a in the hydrogenated block copolymer A is 5% to 25% by mass.

[10]

The hydrogenated block copolymer pellet according to any one of the above [1] to [9], wherein the hydrogenated block copolymer A has the following 4-type structure: the polymeric block a—the polymeric block b (b1)—the polymeric block a—the polymeric block b (b2), the content of the b2 is present in 0.5% to 9% by mass based on the total mass of the hydrogenated block copolymer A, and the content of the b1 is larger than the content of the b2 by 50% by mass or more.

[11]

The hydrogenated block copolymer pellet according to any one of the above [1] to [10], wherein the antiblocking agent of polyethylene-based powder B have the average particle diameter of 1 to 10 μm, and the antiblocking agent of polyethylene-based powder B have the angle of repose of 50° to 65°.

[12]

An adhesive resin composition comprising:

100 parts by mass of the hydrogenated block copolymer pellet according to any one of the above [1] to [11], and 0 to 200 parts by mass of at least one polymer selected from the group consisting of a tackifier C, a thermoplastic elastomer D, and a thermoplastic resin E.

[13]

A surface protection film formed by laminating an adhesive layer comprising the adhesive resin composition according to the above [12] and a base material layer comprising a thermoplastic resin.

Advantageous Effects of Invention

According to the present invention, there can be provided: hydrogenated block copolymer pellets, which can prevent blocking among the pellets, and which can form an adhesive layer that exhibits appropriately high tack strength to an adherend, has small tackiness enhancing, is excellent in film-release property after the film has been preserved in a roll state, and does not contaminate the surface of the adherend even after it is exposed to high temperature conditions; an adhesive resin composition comprising the hydrogenated block copolymer pellets; and a surface protection film having an adhesive layer comprising the adhesive resin composition.

DESCRIPTION OF EMBODIMENT

Hereinafter, the embodiment for carrying out the present invention (hereinafter simply referred to as "the present embodiment") will be described in detail. The present invention is not limited to the following embodiment, and it may be modified in various ways within the range of the gist thereof.

[Hydrogenated Block Copolymer Pellet]

The hydrogenated block copolymer pellet according to a first embodiment has:

100 parts by mass of a pellet molded product of hydrogenated block copolymer A and 0.01 to 1.5 parts by mass of an antiblocking agent of polyethylene-based powder B, wherein the hydrogenated block copolymer A has a polymeric block a mainly comprising at least one vinyl aromatic monomer unit and polymeric block b mainly comprising at least one conjugated diene monomer unit, in which the total content of the 1,2-bond content and the 3,4-bond content in the hydrogenated block copolymer A before hydrogenation is less than 40 mol %, based on the total binding amount of the conjugated diene monomer unit, the content of the polymeric block a in the hydrogenated block copolymer A is 5% to 30% by mass, the polyethylene-based powder B has a number average molecular weight of 15,000 or less, and the antiblocking agent of polyethylene-based powder B have an average particle diameter of 1 to 15 μm.

The hydrogenated block copolymer pellet according to a second embodiment also has:

100 parts by mass of a pellet molded product of hydrogenated block copolymer A and 0.01 to 1.5 parts by mass of an antiblocking agent of polyethylene-based powder B, wherein the hydrogenated block copolymer A has a polymeric block a mainly comprising at least one vinyl aromatic monomer unit and polymeric block b mainly comprising at least one conjugated diene monomer unit, in which the hydrogenated block copolymer A has a Tg of −30° C. to −45° C., the content of the polymeric block a in the hydrogenated block copolymer A is 5% to 30% by mass, the polyethylene-based powder B has a number average molecular weight of 15,000 or less, and the antiblocking agent of polyethylene-based powder B have an average particle diameter of 1 to 15 μm.

Hereinafter, the hydrogenated block copolymer pellets according to the first and second embodiments are collectively referred to as a "hydrogenated block copolymer pellet X" at times. Moreover, it is defined that the hydrogenated block copolymer pellet X refers to both of the hydrogenated block copolymer pellets according to the first and second embodiments, unless it is otherwise specified as a hydrogenated block copolymer pellet of "the first embodiment" or "the second embodiment."

The hydrogenated block copolymer pellet X according to the present embodiment is formed by dusting the polyethylene-based powder B over a pellet molded product of the hydrogenated block copolymer A. The antiblocking agent of polyethylene-based powder B preferably adheres to the surface of the pellet molded product of the hydrogenated block copolymer A. Thereby, the blocking property tends to be further improved.

The content of the antiblocking agent of polyethylene-based powder B is 0.01 to 1.5 parts by mass, preferably 0.05 to 1.0 parts by mass, more preferably 0.1 to 0.8 parts by mass, and even more preferably 0.2 to 0.6 parts by mass, based on 100 parts by mass of the pellet molded product of the hydrogenated block copolymer A. By setting the content of the antiblocking agent of polyethylene-based powder B in the above described range, the blocking-preventing effect is further improved, and a decrease in the tackiness of the hydrogenated block copolymer and an adhesive resin composition mainly comprising the hydrogenated block copolymer pellets can be further suppressed.

A method for confirming the adhesion of the polyethylene-based powder B to the surface of a pellet of the hydrogenated block copolymer A is not particularly limited. An example of the method is washing 500 mg of the hydrogenated block copolymer pellet X with methanol and then evaporating the methanol wash liquid to recover the polyethylene-based powder B.

In the present description, individual monomer units that constitute a polymer are denominated in accordance with the names of monomers from which the monomer units are derived. For instance, the term "vinyl aromatic monomer unit" is used to mean a constitutional unit of a polymer generated as a result of polymerization of a vinyl aromatic compound as a monomer. The structure of the vinyl aromatic monomer unit is a molecular structure in which two carbons of a substituted ethylene group derived from a substituted vinyl group constitute the main chain of a polymer. On the other hand, the term "conjugated diene monomer unit" is used to mean a constitutional unit of a polymer generated as a result of polymerization of a conjugated diene as a monomer. The structure of the conjugated diene monomer unit is a molecular structure in which two carbons of olefin derived from a conjugated diene monomer constitute the main chain of a polymer.

[Hydrogenated Block Copolymer A]

The hydrogenated block copolymer A used in the present embodiment has a polymeric block a mainly comprising at least one vinyl aromatic monomer unit, and a polymeric block b mainly comprising at least one conjugated diene monomer unit.

The total content of the 1,2-bond content and the 3,4-bond content in the hydrogenated block copolymer A of the first embodiment before hydrogenation (hereinafter also referred to as "vinyl bond content") is less than 40 mol %, preferably 38 mol % or less, and more preferably 36 mol % or less, based on the total binding amount of the conjugated diene monomer unit. The lower limit of the total content of the 1,2-bond content and the 3,4-bond content in the hydrogenated block copolymer A before hydrogenation is not particularly limited, and it is preferably 30 mol % or more. By setting the total content of the 1,2-bond content and the 3,4-bond content in the hydrogenated block copolymer A before hydrogenation at less than 40 mol %, the release property of the obtained surface protection film is further improved, and also, the compatibility with melted polyethylene powders is improved, so that contamination to the adherend tends to be prevented. It is to be noted that the total content of the 1,2-bond content before hydrogenation and the 3,4-bond content before hydrogenation can be obtained by the method described in Examples.

The preferred range of the vinyl bond content of the hydrogenated block copolymer A according to the second embodiment can also be set in the same range as that described above.

The hydrogenated block copolymer A of the second embodiment has a Tg (glass transition temperature) of −30° C. to −45° C., preferably −35° C. to −42° C., and more preferably −38° C. to −41° C. By setting Tg in the above-described range, a good balance tends to be obtained between the compatibility with melted polyethylene powders and the flexibility and low-temperature characteristics of the obtained film. It is to be noted that Tg can be obtained by the method described in Examples. It is to be noted that the Tg of the hydrogenated block copolymer A can be regulated by controlling the total content of the 1,2-bond content and the 3,4-bond content in the hydrogenated block copolymer A before hydrogenation, and specifically, the Tg of the hydrogenated block copolymer A can be regulated by setting the total content of the 1,2-bond content and the 3,4-bond content in the hydrogenated block copolymer A before hydrogenation at less than 40 mol %, based on the total binding amount of the conjugated diene monomer unit.

Moreover, the preferred range of the Tg of the hydrogenated block copolymer A of the first embodiment can also be set in the same range as that described above.

The hydrogenated block copolymer A may have an olefinic unsaturated double bond. The hydrogenation ratio of the olefinic unsaturated double bond in the hydrogenated block copolymer A is preferably 50% or more, more preferably 65% or more, even more preferably 80% or more, and further preferably 90% or more. By setting the hydrogenation ratio in the above described range, the heat resistance of the obtained hydrogenated block copolymer or the adhesive resin composition upon the production of a film tends to be further improved. The upper limit of the hydrogenation ratio is not particularly limited, and it is preferably 100%. It is to be noted that the hydrogenation ratio of the olefinic unsaturated double bond in the hydrogenated block copolymer A can be obtained by the method described in Examples.

From the viewpoint of flexibility and blocking-preventing effect, the hardness (JIS-A) of the hydrogenated block copolymer A is preferably 30° to 80°, more preferably 30° to 65°, and even more preferably 35° to 60°. It is to be noted that the hardness can be obtained by the method described in Examples.

From the viewpoint of the productivity and formability of the hydrogenated block copolymer, the melt flow rate (ASTM D1238: 230° C., 2.16 Kg loaded) of the hydrogenated block copolymer A is preferably 0.5 to 60 g/10 minutes, more preferably 1 to 55 g/10 minutes, even more preferably 2 to 50 g/10 minutes, and further preferably 3 to 45 g/10 minutes. It is to be noted that the melt flow rate can be obtained by the method described in Examples.

The weight average molecular weight of the hydrogenated block copolymer A is preferably 40,000 to 500,000, more preferably 50,000 to 300,000, and even more preferably 60,000 to 250,000. In addition, the molecular weight distribution of the hydrogenated block copolymer A is preferably 1.3 or less, more preferably 1.2 or less, even more preferably 1.1 or less, and further preferably 1.08 or less. By setting the weight average molecular weight or molecular weight distribution of the hydrogenated block copolymer A at the above described range, a balance between the strength of a film and formability tends to be further improved. It is to be noted that the weight average molecular weight and molecular weight distribution of the hydrogenated block copolymer A can be obtained by the methods described in Examples.

(Polymeric Block a)

The polymeric block a mainly comprises a vinyl aromatic monomer unit. The vinyl aromatic monomer used in the present embodiment is not particularly limited. Examples of the vinyl aromatic monomer include styrene, α-methylstyrene, p-methylstyrene, divinylbenzene, 1,1-diphenylethylene, N,N-dimethyl-p-aminoethylstyrene, and N,N-diethyl-p-aminoethylstyrene. Among these, styrene is preferable. These vinyl aromatic monomers may be used singly or in combinations of two or more. By allowing the vinyl aromatic monomer unit to comprise a styrene unit, it tends to be more excellent in availability and manufacturability.

The term "mainly comprising" as used herein means that the content of a certain monomer unit is 60% by mass or more. The content of the vinyl aromatic monomer unit is preferably 60% by mass or more, more preferably 80% by mass or more, even more preferably 90% by mass or more, and particularly preferably 95% by mass or more, based on 100% by mass of the polymer block a. The upper limit of the content of the vinyl aromatic monomer unit in the polymeric block a is not particularly limited, and it is preferably 100% by mass. By setting the content of the vinyl aromatic monomer unit in the above described range, the phase separation property between the polymeric block a and the polymeric block b is improved, and a surface protection film having an adhesive layer that is more excellent in tackiness tends to be obtained.

Constitutional units for the polymeric block a, other than the vinyl aromatic monomer unit, are not particularly limited, and examples of such other constitutional units include a conjugated diene monomer unit.

The content of the polymeric block a is 5% to 30% by mass, preferably 5% to 25% by mass, and more preferably 5% to 10% by mass, based on 100% by mass of the hydrogenated block copolymer A. By setting the content of the polymeric block a in the above described range, the tackiness of the obtained surface protection film is further increased, and also, the incompatibility with melted polyethylene-based powders is reduced, so that the migration of the melted polyethylene powders to the adherend can be prevented.

(Polymeric Block b)

The polymeric block b mainly comprises a conjugated diene monomer unit. The conjugated diene monomer used in the present embodiment is not particularly limited. Examples of the conjugated diene monomer include diolefin having a pair of conjugated double bonds. The type of such a conjugated diene monomer is not particularly limited. Specific examples thereof include: butadienes such as 1,3-butadiene, 2-methyl-1,3-butadiene (isoprene), and 2,3-dimethyl-1,3-butadiene; and 1,3-pentadiene, 2-methyl-1,3-pentadiene, and 1,3-hexadiene. Among these, butadienes are preferable, and 1,3-butadiene is more preferable. These substances may be used singly or in combinations of two or more. By allowing the conjugated diene monomer unit to comprise a butadiene unit, it tends to be more excellent in availability and manufacturability.

The content of the conjugated diene monomer unit is preferably 60% by mass or more, more preferably 80% by mass or more, even more preferably 90% by mass or more, and particularly preferably 95% by mass or more, based on 100% by mass of the polymeric block b. By setting the content of the conjugated diene monomer unit in the above described range, the phase separation property between the polymeric block a and the polymeric block b is improved, and a surface protection film having an adhesive layer that is more excellent in tackiness tends to be obtained.

Constitutional units for the polymeric block b, other than the conjugated diene monomer unit, are not particularly limited, and examples of such other constitutional units include a vinyl aromatic monomer unit.

The content of the polymeric block b is preferably 95% to 70% by mass, more preferably 95% to 75% by mass, and even more preferably 95% to 90% by mass, based on 100% by mass of the hydrogenated block copolymer A. By setting the content of the polymeric block b in the above described range, the tackiness of the obtained surface protection film is further increased, and also, the incompatibility with melted polyethylene-based powders is reduced, so that the migration of the melted polyethylene-based powders to the adherend tends to be prevented.

In addition, the microstructure (the ratio of cis, trans and vinyl) of the conjugated diene monomer portion can be arbitrarily changed using the after-mentioned polar compound or the like.

(Polymeric Block c)

The hydrogenated block copolymer A used in the present embodiment may further comprise a polymeric block c randomly comprising conjugated diene monomer units and vinyl aromatic monomer units. By allowing the hydrogenated block copolymer A to further comprise the polymer block c, the tackiness enhancing of the obtained adhesive resin composition tends to be suppressed. The terms conjugated diene monomer unit and vinyl aromatic monomer unit used herein are not particularly limited, and the same units as those described above can be used herein.

It is to be noted that the content of the polymer block c is preferably 35% by mass or less, more preferably 30% by mass or less, and even more preferably 25% by mass or less, based on 100% by mass of the hydrogenated block copolymer A. The lower limit of the content of the polymer block c is not particularly limited, and it is preferably 0% by mass or more. By setting the content of the polymer block c in the above described range, the tackiness enhancing of the obtained surface protection film tends to be suppressed.

[Method for Producing Hydrogenated Block Copolymer A]
(Method for Producing Block Copolymer Before Hydrogenation)

The block copolymer before hydrogenation is not particularly limited. For example, it can be obtained by performing anionic living polymerization of a conjugated diene monomer and a vinyl aromatic monomer using a lithium initiator in a hydrocarbon solvent. The type of the hydrocarbon solvent is not particular limited. Examples of the hydrocarbon solvent include: aliphatic hydrocarbons such as n-butane, isobutane, n-pentane, n-hexane, n-heptane, and n-octane; alicyclic hydrocarbons such as cyclohexane, cycloheptane, and methylcycloheptane; and aromatic hydrocarbons such as benzene, toluene, xylene, and ethylbenzene.

The type of the lithium initiator is not particularly limited. Examples of the lithium initiator include a monolithium compound, a dilithium compound, a trilithium compound, and a tetralithium compound, each of which may have an aliphatic group containing 1 to 20 carbon atoms and/or an aromatic group containing 1 to 20 carbon atoms. The type of such a lithium compound is not particularly limited, and examples of the lithium compound include n-propyl lithium, n-butyl lithium, sec-butyl lithium, tert-butyl lithium, n-pentyl lithium, n-hexyl lithium, benzyl lithium, phenyl lithium, tolyl lithium, a reaction product of diisopropenylbenzene with sec-butyl lithium, and a reaction product from divinylbenzene, sec-butyl lithium and a small amount of 1,3-butadiene. Among these, n-butyl lithium and sec-butyl lithium are preferable in terms of polymerization activity.

In general, the amount of the lithium initiator used is preferably 0.01 to 0.5 phm (mass part(s) based on 100 parts by mass of monomer), more preferably 0.03 to 0.3 phm, and even more preferably 0.05 to 0.15 phm, although it depends on the molecular weight of a block copolymer before hydrogenation of interest.

In the present embodiment, when a conjugated diene monomer and a vinyl aromatic monomer are subjected to block copolymerization using a lithium initiator as a polymerization initiator, a tertiary amine compound can be added as a polar compound to the reaction system. The type of the tertiary amine compound is not particularly limited. A compound represented by the following formula can be used as a tertiary amine compound, for example.

$$R^1R^2R^3N$$

wherein $R^1$, $R^2$, and $R^3$ each represent a hydrocarbon group containing 1 to 20 carbon atoms, or a hydrocarbon group having a tertiary amino group.

Such a polar compound is not particularly limited. Examples of such a polar compound include trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine, and N,N'-dioctyl-p-phenylenediamine. Among these, N,N,N',N'-tetramethylethylenediamine is preferable.

The polar compound is used to control the vinyl bond content of the polymeric block b before hydrogenation. The amount of the polar compound used can be regulated, depending on the vinyl bond content of the polymeric block b of interest before hydrogenation (the total content of the 1,2-bond content and the 3,4-bond content before hydrogenation). In order to set the vinyl bond content in the range that is determined in the present invention, the polar compound is used in an amount of preferably 0.05 to 2 (mol/Li), and more preferably 0.1 to 1 (mol/Li), based on the amount of the lithium initiator.

Sodium alkoxide may be allowed to coexist during block copolymerization. The sodium alkoxide used is not particularly limited. Examples of the sodium alkoxide include compounds represented by the following formula. Among the compounds, sodium alkoxide having an alkyl group containing 3 to 6 carbon atoms is preferable, and sodium t-butoxide and sodium t-pentoxide are more preferable.

NaOR wherein R represents an alkyl group containing 2 to 12 carbon atoms.

The amount of the sodium alkoxide is preferably 0.010 or more and less than 0.1 (molar ratio), more preferably 0.010 or more and less than 0.08 (molar ratio), even more preferably 0.010 or more and less than 0.06 (molar ratio), and further preferably 0.015 or more and less than 0.05 (molar ratio), based on the polar compound. When the used amount of the sodium alkoxide is in the above-mentioned range, there can be obtained, at a high production rate, a block copolymer, which has a polymeric block b with a high vinyl bond content before hydrogenation and a polymeric block a with a narrow molecular weight distribution, and which also has a narrow molecular weight distribution and high intensity.

The method of subjecting a conjugated diene monomer and a vinyl aromatic monomer to block copolymerization using a lithium initiator as a polymerization initiator is not particularly limited. It may be either batch polymerization or continuous polymerization. Otherwise, it may also be a combination thereof. In particular, in order to obtain a block copolymer having a narrow molecular weight distribution and high intensity, a batch polymerization method is preferable. The polymerization temperature is generally from 0° C. to 150° C., preferably from 30° C. to 120° C., and more preferably from 40° C. to 100° C. The time required for polymerization is different depending on conditions. It is generally within 24 hours, and preferably from 0.1 to 10 hours. The atmosphere in the polymerization system is preferably an inert gas atmosphere such as nitrogen gas. The polymerization pressure may be set in a pressure range sufficient for maintaining the monomer and the solvent to be a liquid phase in the above described polymerization temperature range, and thus, it is not particularly limited. Further, it is preferable that impurities that inactivate an initiator and a living polymer, such as water, oxygen and carbon dioxide, be not present in the polymerization system.

In the present embodiment, it is possible that an addition reaction be performed to add a denaturant, so as to add a functional group-containing atomic group to a living end of the block copolymer obtained by the above described method. It is also possible that a coupling agent be allowed to use so as to couple the block copolymer obtained by the above described method. The aforementioned functional group-containing atomic group is not particularly limited. An example of the atomic group is an atomic group containing at least one functional group selected from the groups consisting of a hydroxyl group, a carbonyl group, a thiocarbonyl group, an acid halide group, an acid anhydride group, a carboxyl group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thioepoxy group, a sulfide group, an isocyanate group, an isothiocyanate group, a halogenated silicon group, a silanol group, an alkoxy silicon group, a halogenated tin group, an alkoxy tin group, a phenyl tin group, and the like.

The denaturant to add a functional group-containing atomic group is not particularly limited. Examples of the denaturant include tetraglycidylmetaxylenediamine, tetraglycidyl-1,3-bisaminomethylcyclohexane, ε-caprolactone, δ-valerolactone, 4-methoxybenzophenone, γ-glycidoxyethyltrimethoxysilane, γ-glycidoxypropyltrimethoxysilane, γ-glycidoxypropyldimethylphenoxysilane, bis(γ-glycidoxypropyl)methylpropoxysilane, 1,3-dimethyl-2-imidazolidinone, 1,3-diethyl-2-imidazolidinone, N,N'-dimethylpropyleneurea, and N-methylpyrrolidone. In the present embodiment, the reaction temperature applied in the addition reaction is preferably 0° C. to 150° C., and more preferably 20° C. to 120° C. The time required for the denaturation reaction is preferably within 24 hours, and more preferably 0.1 to 10 hours, although it is different depending on other conditions.

The type of the coupling agent is not particularly limited, and a conventionally known coupling agent can be applied. Examples of such a bifunctional coupling agent include, but not particularly limited to: alkoxy silane compounds such as trimethoxysilane, triethoxysilane, tetramethoxysilane, tetraethoxysilane, dimethyldimethoxysilane, diethyldimethoxysilane, dichlorodimethoxysilane, dichlorodiethoxysilane, trichloromethoxysilane, and trichloroethoxysilane; dihalogen compounds such as dichloroethane, dibromoethane, dimethyldichlorosilane, and dimethyldibromosilane; and acid esters such as methyl benzoate, ethyl benzoate, phenyl benzoate, and phthalic acid ester.

The type of a multifunctional coupling agent, such as a tri- or more functional coupling agent, is not particularly limited. Examples of such a multifunctional coupling agent include: tri- or more valent polyalcohols; polyvalent epoxy compounds such as epoxidated soybean oil, diglycidyl bisphenol A, and 1,3-bis(N,N'-diglycidylaminomethyl)cyclohexane; halogenated silicon compounds represented by the general formula R4-nSiXn (wherein R represents a hydrocarbon group containing 1 to 20 carbon atoms, X represents halogen, and n represents an integer of 3 or 4), such as methylsilyl trichloride, t-butylsilyl trichloride, silicon tetrachloride, and their bromide; halogenated tin compounds represented by the general formula R4-nSnXn (wherein R represents a hydrocarbon group containing 1 to 20 carbon atoms, X represents halogen, and n represents an integer of 3 or 4), such as polyvalent halogen compounds including methyl tin trichloride, t-butyl tin trichloride, and tin tetrachloride. Other examples include dimethyl carbonate and diethyl carbonate.

(Hydrogenation Reaction)

Using a hydrogenation catalyst, the above obtained block copolymer before hydrogenation is hydrogenated, so that a hydrogenated block copolymer A can be produced. A preferred hydrogenation catalyst is not particularly limited. Examples of the hydrogenation catalyst include titanocene compounds, reducing organometallic compounds, and mixtures of titanocene compounds and reducing organometallic compounds. Titanocene compounds are not particularly limited, but, for example, the compounds described in Japanese Patent Laid-Open No. 8-109219 can be used. Specific examples thereof include: compounds comprising at least one ligand having a (substituted) cyclopentadienyl skeleton, indenyl skeleton or fluorenyl skeleton, such as biscyclopentadienyltitanium dichloride or monopentamethylcyclopentadienyltitanium trichloride. The reducing organometallic compound is not particularly limited. Examples of the reducing organometallic compound include organoalkaline metal compounds such as organic lithium, organic magnesium compounds, organic aluminum compounds, organic boron compounds, and organic zinc compounds. The hydrogenation reaction temperature is generally 0° C. to 200° C., and more preferably 30° C. to 150° C.

The pressure of hydrogen used in the hydrogenation reaction is generally 0.1 to 15 MPa, preferably 0.2 to 10 MPa, and more preferably 0.3 to 5 MPa. In addition, the time required for the hydrogenation reaction is generally 3 minutes to 10 hours, and preferably 10 minutes to 5 hours. The hydrogenation reaction can be carried out by any one of a batch process, a continuous process, and a combination thereof.

The catalyst residue may be removed from the above obtained hydrogenated block copolymer solution, as necessary, and the hydrogenated block copolymer may be then separated from the solvent, so as to obtain a hydrogenated block copolymer A. Examples of the method of separating the hydrogenated block copolymer from the solvent include: a method comprising adding a polar solvent that is a poor solvent with respect to the copolymer, such as acetone or alcohol, to the reaction solution, then precipitating the copolymer, and then separating the hydrogenated block copolymer from the solution by filtration or the like; a method comprising adding the reaction solution to boiled water under stirring and then removing the solvent from the reaction solution according to steam stripping, so as to separate the hydrogenated block copolymer A from the solvent; and a method of directly heating the polymer solution to distill the solvent away, so as to separate the hydrogenated block copolymer A from the solvent. Furthermore, to the above obtained hydrogenated block copolymer A, various stabilizers such as phenolic stabilizers, phosphorous stabilizers, sulfur stabilizers, or amine stabilizers can be added.

The above obtained hydrogenated block copolymer A is not particularly limited. Examples of the structure of the hydrogenated block copolymer A include the structures represented by the following formulae.

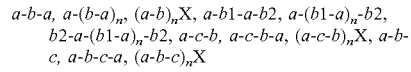

In the above formulae, a represents a polymeric block a; b, b1, and b2 each represent a hydrogenated polymeric block b; c represents a polymeric block c randomly comprising a hydrogenated conjugated diene monomer unit and vinyl aromatic monomer units. The boundary of each polymeric block does not need to be necessarily clearly divided. In addition, n represents the number of a repeat in the parentheses, and it is an integer of 1 or greater, and preferably an integer of 1 to 5. X represents a residue of a denaturant or a residue of a coupling agent. Moreover, the mass of a, b, b1, and b2 may be identical to or different from one another.

In the present embodiment, in view of anti-blocking property, 50% by mass or more of the block copolymer is preferably coupled based on 100% by mass of the block copolymer before coupling. Furthermore, from the viewpoint of the flexibility, stress-whitening property, surface smoothness and transparency of the obtained hydrogenated block copolymer, adhesive resin composition, and adhesive layer comprising the adhesive resin composition, the hydrogenated block copolymer preferably has a sequentially polymerized structure such as a-b-a and a-b1-a-b2, and more preferably has a 4-type structure that is a-b1-a-b2.

When the hydrogenated block copolymer A has such a 4-type structure that is polymeric block a—polymeric block b (b1)—polymeric block a—polymeric block b (b2), the content of b2 is preferably 0.5% to 9% by mass, more preferably 1% to 7.5% by mass, and even more preferably 2% to 6% by mass, based on 100% by mass of the hydrogenated block copolymer A. In addition, the mass of b1 is greater than the mass of b2, preferably by 50% by mass or more, more preferably by 60% by mass, and even more preferably by 65% by mass, based on 100% by mass of the b2. By using the hydrogenated block copolymer A having such a structure, a surface protection film having sufficient initial tack strength and suppressed tackiness enhancing tends to be obtained.

[Pellet Molded Product of Hydrogenated Block Copolymer A]

The above obtained hydrogenated block copolymer A is subjected to pelletizing. Pelletizing can be carried out according to a conventionally known method. Examples of the pelletizing method include: a method comprising extruding the hydrogenated block copolymer A into a strand shape through a single screw or twin screw extruder, then cooling it with water or in air, and then cutting the resultant with a strand cutter; a method comprising establishing a rotation cutter to the front of a die portion of a single screw or twin screw extruder, and then cutting a strand-shaped hydrogenated block copolymer A immediately after extruded through the die in a water flow or in water; and a method comprising melt-blending the hydrogenated block copolymer A using an open roll and a Banbury mixer, molding the resultant into a sheet shape using a roll, cutting the sheet into a strip shape, and cutting it into cuboidal pellets using a pelletizer. It is to be noted that the size and shape of a pellet molded product of the hydrogenated block copolymer A are not particularly limited.

The term "pellet molded product" is used not only to mean a pellet-shaped molded product, but also to mean a clam-shaped molded product. A clam-shaped hydrogenated block copolymer A can be prepared according to a conventionally known method. An example of the method is a method of obtaining a clam-shaped hydrogenated block copolymer A by removing a solvent from a solution or slurry of the hydrogenated block copolymer A according to steam stripping. It is to be noted that the size and shape of such a clam-shaped hydrogenated block copolymer A are not particularly limited.

[Polyethylene-Based Powder B]

The polyethylene-based powder B is not particularly limited, as long as it is polyethylene resin powder having a number average molecular weight of 15,000 or less. It is preferably homopolyethylene-based powder, and more preferably high-density polyethylene-based powder. By using such powder, a surface protection film, which has excellent initial tack strength and further suppressed tackiness enhancing and is excellent in anti-surface contamination property, tends to be obtained.

The number average molecular weight of the polyethylene-based powder B is 15,000 or less, preferably 1,000 to 15,000, more preferably 1,000 to 10,000, even more preferably 1,000 to 5,000, and further preferably 1,000 to 3,000. By setting the number average molecular weight of the polyethylene-based powder B at 15,000 or less, the blocking-preventing effect is further improved, and the surface smoothness of the obtained surface protection film is further improved, and because of the improvement of the surface smoothness, the tackiness enhancing of the obtained surface protection film tends to be further suppressed.

The number of peaks of the polyethylene-based powder B, which is measured by GPC, may be either one or two or more, if the number average molecular weight is 15,000 or less. When the number of peaks measured by GPC is one, the molecular weight distribution is preferably 1.5 to 5, more preferably 2 to 4.5, even more preferably 2.5 to 4, and further preferably 3 to 3.8. On the other hand, when a plurality of peaks are found by the GPC measurement, if the total number average molecular weight is 15,000 or less, the polyethylene-based powder B may contain 30% by mass or less of peak components having a number average molecular weight of 20,000 to 300,000. By using such polyethylene-based powder B, the polyethylene-based powder B tends to be more excellent in blocking-preventing effect and a reduction in tackiness enhancing caused by the surface smoothness of the obtained surface protection film. It is to be noted that the number average molecular weight and molecular weight distribution of the polyethylene-based powder B can be measured by the methods described in Examples.

The amount of the metal residual derived from a polyethylene catalyst contained in the polyethylene-based powder B is preferably 30 ppm or less, more preferably 25 ppm or less, and even more preferably 20 ppm or less. The type of the metal residuallic component is not particularly limited. Examples of the metal residuallic component include Ti, Mg, Fe, AL, Ca, and a compound comprising the same. When the amount of the metal residual is 30 ppm or less, a hydrogenated block copolymer pellet X, which is more excellent in low bleed-out property on the surface, low precipitation property obtained when used under high pH conditions, low combustion ash content, and safety (with intended uses for food products and/or medical products), tends to be obtained. It is to be noted that the amount of the metal residual can be obtained by the method described in Examples.

The amount of the residual oligomer contained in the polyethylene-based powder B is preferably 0.3 wt % or less, more preferably 0.25 wt % or less, and even more preferably 0.2 wt % or less. When the amount of the residual oligomer is 0.3 wt % or less, a surface protection film, which is more excellent in anti-adherend contamination property, tends to be obtained. It is to be noted that the amount of the residual oligomer can be obtained by the method described in Examples.

The content of ash in the polyethylene-based powder B is preferably 0.01 wt % or less, more preferably 0.08 wt % or less, and even more preferably 0.06 wt % or less. When the ash content is 0.01 wt % or less, the molded product tends to obtain a surface protection film, which is more excellent in anti-adherend contamination property. The ash content can be obtained by the method described in Examples.

The polyethylene-based powder B preferably does not contain impurities (stabilizers, etc.), other than metallic components, residual oligomers, and ash contents. Thereby, a surface protection film, which is more excellent in anti-adherend contamination property, tends to be obtained.

The shear modulus G' at 40° C. of polyethylene contained in the polyethylene-based powder B, which is obtained by measuring dynamic viscoelasticity at a frequency of 1 Hz, is preferably 500 MPa or more. By using such polyethylene, the polyethylene-based powder B tends to be more excellent in blocking-preventing effect.

The melting point of the polyethylene-based powder B is preferably 110° C. or higher, more preferably 115° C. or higher, even more preferably 117° C. or higher, further preferably 120° C. or higher, and particularly preferably 123° C. or higher. When the melting point of the polyethylene-based powder B is in the above-mentioned range, the polyethylene-based powder B tends to be more excellent in blocking-preventing effect. The melting point of the polyethylene-based powder B can be obtained by the method described in Examples.

The density of the polyethylene-based powder B is preferably 0.94 or more, more preferably 0.95 or more, and even more preferably 0.96 or more. When the density of the polyethylene-based powder B is in the above-mentioned range, the polyethylene-based powder B tends to be more excellent in blocking-preventing effect.

[Antiblocking Agent of Polyethylene-Based Powder B]

The average particle diameter of antiblocking agent of polyethylene-based powder B is 1 to 15 µm, preferably 1 to 10 µm, and more preferably 2 to 8 µm. When the average particle diameter is in the above-mentioned range, the polyethylene-based powder B used as antiblocking agent to be applied to the hydrogenated block copolymer is excellent in prevention of blocking among the pellet molded products of the hydrogenated block copolymer A, namely, the effect of preventing blocking among hydrogenated block copolymer pellets X. Moreover, the unevenness of the adhesive layer of the obtained surface protection film is reduced, and thereby, the surface protection film with further suppressed tackiness enhancing can be obtained. The term "average particle diameter" is used to mean a particle diameter that provides an integration value of 50% in the mass distribution of measurement values. The average particle diameter can be regulated in the above described range by changing crushing conditions such as chemical crushing or jet mill crushing.

Furthermore, the maximum particle diameter (<99.9%) of the antiblocking agent of polyethylene-based powder B is preferably 30 µm or less, more preferably 28 µm or less, even more preferably 26 µm or less, and further preferably 24 µm or less. When the maximum particle diameter is in the above-mentioned range, the polyethylene-based powder B used as antiblocking agent to be applied to the hydrogenated block copolymer is excellent in prevention of blocking among the pellet molded products of the hydrogenated block copolymer A, namely, the effect of preventing blocking among hydrogenated block copolymer pellets X. Moreover, the unevenness of the adhesive layer of the obtained surface protection film is reduced, and thereby, the surface protection film with further suppressed tackiness enhancing tends to be obtained.

The average particle diameter and the maximum particle diameter can be measured by the method described in Examples.

The angle of repose of the antiblocking agent of polyethylene-based powder B is preferably 45° to 70°, more preferably 50° to 65°, and even more preferably 52° to 62°. When the angle of repose of the antiblocking agent of polyethylene-based powder B is in the above-mentioned range, the polyethylene-based powder B is more excellent in prevention of blocking among the pellet molded products of the hydrogenated block copolymer A, and further, in the effect of preventing blocking among hydrogenated block copolymer pellets X (easy entangling in the hydrogenated block copolymer pellet A) and the stability of feeding the polyethylene-based powder B. The angle of repose can be measured by the method described in Examples. The angle of repose can be regulated in the above described range by changing crushing conditions such as chemical crushing or jet mill crushing.

[Method of Producing Polyethylene-Based Powder B]

The method of producing the polyethylene-based powder B is not particularly limited. A conventionally known method can be applied. Examples of the production method include chemical crushing, in which polyethylene is dissolved in a solvent and is then crushed, and jet mill crushing.

[Method of Producing Hydrogenated Block Copolymer Pellet X]

Moreover, the method of mixing a pellet molded product of the hydrogenated block copolymer A with the antiblocking agent of polyethylene-based powder B is not particularly limited. Examples of the mixing method include: a method of mixing the two substances using a mixer such as a tumbler; a method of allowing a dispersion prepared by dispersing the polyethylene-based powder B in water in the presence or absence of a surfactant to come into contact with a pellet of the hydrogenated block copolymer A; and a method comprising a step of extruding the hydrogenated block copolymer A into a strand shape through an extruder, cooling the strand with water, and cutting the resulting strand with a strand cutter, wherein a dispersion of the polyethylene-based powder B is added into the cooling water.

[Adhesive Resin Composition]

The adhesive resin composition according to the present embodiment comprises 0 to 200 parts by mass of at least one polymer selected from the group consisting of a tackifier C, a thermoplastic elastomer D, and a thermoplastic resin E, based on 100 parts by mass of the above described hydrogenated block copolymer pellet X. The total content of the tackifier C, the thermoplastic elastomer D and the thermoplastic resin E is 0 to 200 parts by mass, preferably 10 to 100 parts by mass, and more preferably 20 to 75 parts by mass, based on 100 parts by mass of the hydrogenated block copolymer pellet X. By setting the total content of the tackifier C, the thermoplastic elastomer D and the thermoplastic resin E in the above described range, a surface protection film, in which tackiness enhancing and adherend contamination are further suppressed, tends to be obtained.

The tackifier C, the thermoplastic elastomer D and the thermoplastic resin E may be used singly or in combinations of two or more. When a plurality of the tackifier C, the thermoplastic elastomer D and the thermoplastic resin E are used, the mixing ratio of these components is different depending on the material or surface shape of an adherend to be coated with the surface protection film, or values required for surface unevenness and initial tack strength, or the like. Thus, these conditions can be adjusted, as appropriate.

(Tackifier C)

The tackifier C is not particularly limited. Examples of the tackifier C include known tackifiers such as a rosin terpene resin, a hydrogenated rosin terpene resin, a coumarone resin, a phenol resin, terpene-phenol resin, an aromatic hydrocarbon resin, and an aliphatic hydrocarbon resin. The tackifier may be used singly or in combination of two or more.

The adhesive resin composition may comprise a tackifier. The tackifier is not particularly limited. Examples of the tackifier include those described in "Gum/Plastic Haigo Yakuhin (Drugs to be Mixed into Rubbers and Plastics)" (edited by Rubber Digest). By using the tackifier, tack strength tends to be further improved.

The content of the tackifier C in the adhesive composition is preferably 0 to 200 parts by mass, more preferably 10 to 100 parts by mass, and even more preferably 20 to 75 parts by mass, based on 100 parts by mass of the hydrogenated block copolymer A. If the content of the tackifier exceeds 200 parts by mass, tackiness enhancing becomes too strong, and adherend contamination easily occurs upon peeling, and thus, it is not preferable.

(Thermoplastic Elastomer D)

The thermoplastic elastomer D is not particularly limited. Examples of the thermoplastic elastomer D include: a butadiene rubber and a hydrogenated product thereof; a styrene-butadiene rubber and a hydrogenated product thereof (except for the hydrogenated block copolymer of the present embodiment); an isoprene rubber; an acrylonitrile-butadiene rubber and a hydrogenated product thereof; olefinic elastomers such as 1,2-polybutadiene, a chloroprene rubber, an ethylene-propylene rubber, an ethylene-propylene-diene rubber (EPDM), an ethylene-butene-diene rubber, an ethylene-butene rubber, an ethylene-hexene rubber, and an ethylene-octene rubber; a butyl rubber; an acryl rubber; a fluorine rubber; a silicone rubber; a chlorinated polyethylene rubber; an epichlorohydrin rubber; an $\alpha,\beta$-unsaturated nitrile-acrylic acid ester-conjugated diene copolymer rubber; a urethane rubber; a polysulfide rubber; a styrene-butadiene block copolymer, and a hydrogenated product thereof; styrene elastomers, such as a styrene-isoprene block copolymer and a hydrogenated product thereof; and a natural rubber. Among these, olefinic elastomers, such as an ethylene-butene rubber, an ethylene-octene rubber, and an ethylene-propylene-diene rubber (EPDM), are preferable.

The thermoplastic elastomer D may be a modified rubber having a functional group (e.g., a carboxyl group, a carbonyl group, an acid anhydride group, a hydroxyl group, an epoxy group, an amino group, a silanol group, an alkoxysilane group, etc.).

The content of the thermoplastic elastomer D in the adhesive composition is preferably 0 to 200 parts by mass, more preferably 10 to 100 parts by mass, and even more preferably 20 to 75 parts by mass, based on 100 parts by mass of the hydrogenated block copolymer A. If the content of the thermoplastic elastomer D exceeds 200 parts by mass, tackiness enhancing becomes too strong, and adherend contamination easily occurs upon peeling, and thus, it is not preferable.

(Thermoplastic Resin E)

The thermoplastic resin E is not particularly limited. Examples of the thermoplastic resin E include: a block copolymer resin comprising a conjugated diene monomer and a vinyl aromatic monomer, and a hydrogenated product thereof (except for the hydrogenated block copolymer of the present embodiment); a polymer of vinyl aromatic monomers; a copolymer resin of a vinyl aromatic monomer and another vinyl monomer (e.g., ethylene, propylene, butylene, vinyl chloride, vinylidene chloride, vinyl acetate, acrylic acid, acrylic acid ester such as methyl acrylate, methacrylic acid, methacrylic acid ester such as methyl methacrylate, acrylonitrile, methacrylonitrile, etc.); a rubber-modified styrene resin (HIPS); an acrylonitrile-butadiene-styrene copolymer resin (ABS); a methacrylic acid ester-butadiene-styrene copolymer resin (MBS); polyethylene; a copolymer of ethylene and another monomer copolymerizable with the ethylene, which contains 50% by weight or more of the ethylene, such as an ethylene-propylene copolymer, an ethylene-butylene copolymer, an ethylene-hexene copolymer, an ethylene-octene copolymer, an ethylene-vinyl acetate copolymer, and a hydrolysate thereof; a polyethylene resin such as an ethylene-acrylic acid ionomer or chlorinated polyethylene; polypropylene; a copolymer of propylene and another monomer copolymerizable with the propylene, which contains 50% by weight or more of the propylene, such as a propylene-ethylene copolymer, a propylene-ethyl acrylate copolymer, or a polypropylene resin such as chlorinated polypropylene; a cyclic olefinic resin such as an ethylene-norbornene resin; a polybutene resin; a polyvinyl chloride resin, a polyvinyl acetate resin, and a hydrolysate thereof; a polymer of acrylic acid and an ester or an amide thereof; a polyacrylate resin; a polymer of acrylonitrile and/or methacrylonitrile; a nitrile resin that is a copolymer consisting of an acrylonitrile monomer and another copolymerizable monomer, wherein the content of the acrylonitrile monomer unit is 50% by weight or more; a polyamide resin such as nylon-46, nylon-6, nylon-66, nylon-610, nylon-11, nylon-12, or a nylon-6-nylon-12 copolymer; a polyester resin; a thermoplastic polyurethane resin; a polycarbonate polymer such as poly-4,4'-dioxydiphenyl-2,2'-propane carbonate; thermoplastic polysulfone such as polyethersulfone or polyallylsulfone; a polyoxymethylene resin; a polyphenylene ether resin such as poly(2,6-dimethyl-1,4-phenylene)ether; a polyphenylene sulfide resin such as polyphenylene sulfide or poly-4,4'-diphenylene sulfide; a polyarylate resin; a polyether ketone polymer or copolymer; a polyketone resin; a fluorine resin; a polyoxybenzoyl polymer; a polyimide resin; and a polybutadiene resin such as 1,2-polybutadiene or transpolybutadiene. Among these, a polyethylene resin or a polypropylene resin is preferable.

The content of the thermoplastic resin E in the adhesive composition is preferably 0 to 200 parts by mass, more preferably 10 to 100 parts by mass, and even more preferably 20 to 75 parts by mass, based on 100 parts by mass of the hydrogenated block copolymer A. If the content of the thermoplastic resin E exceeds 200 parts by mass, tackiness enhancing becomes too strong, and adherend contamination easily occurs upon peeling, and thus, it is not preferable.

[Surface Protection Film]

The surface protection film according to the present embodiment is formed by laminating an adhesive layer comprising the adhesive resin composition of the present embodiment and a base material layer consisting of a thermoplastic resin. Herein, examples of the thermoplastic resin are the same as those of the aforementioned thermoplastic resin E.

The surface protection film according to the present embodiment exhibits appropriately high tack strength to an adherend, has small tackiness enhancing, is excellent in film-release property after the film has been preserved in a roll state, and does not contaminate the surface of the adherend even after it is exposed to high temperature conditions, and thus, the present surface protection film can be widely used for building materials, optical components, automobiles, home appliances, daily necessaries, etc. Among others, the present surface protection film can be preferably used for optical components, which are required to have anti-adherend contamination property at a high temperature.

EXAMPLES

Hereinafter, the present embodiment will be specifically described in the following examples. However, these examples are not intended to limit the present embodiment. In the below-described Examples and Comparative Examples, according to the after-mentioned methods, hydrogenated block copolymers were prepared, and surface protection films were then produced. After that, comparisons were made among them in terms of physical properties. Upon making comparisons, the properties of hydrogenated block copolymers and the physical properties were measured as follows.

[Measurement Methods]
(1) Measurement of content of polymeric block a (hereinafter also referred to as "styrene content"), the total content of the 1,2-bond content and the 3,4-bond content before hydrogenation (hereinafter also referred to as "the vinyl bond content of conjugated diene"), and hydrogenation ratio of unsaturated bond based on conjugated diene compound The content of the polymeric block a (styrene content), the total content of the 1,2-bond content and the 3,4-bond content before hydrogenation (the vinyl bond content of a conjugated diene), and the hydrogenation ratio of an unsaturated bond based on a conjugated diene compound were measured by nuclear magnetic resonance spectrum analysis (NMR) performed on the hydrogenated block copolymer A. The following apparatuses and measurement conditions were used in the nuclear magnetic resonance spectrum analysis (NMR).

[Apparatuses]
measurement apparatus: JNM-LA400 (manufactured by JEOL, trade name)
solvent: deuterated chloroform
chemical shift standard: TMS (tetramethylsilane)
[Measurement Conditions]
concentration of a sample: 50 mg/mL
observing frequency: 400 MHz
pulse delay: 2.904 seconds
number of scanning: 64
pulse width: 45°
measurement temperature: 26° C.
(2) Tan δ Peak Temperature (Tg)

A measurement material was cut into a size of 10 mm in width and 35 mm in length, and it was used as a measurement sample. The measurement sample was set into a twist type geometry of the device ARES (manufactured by TA Instruments, trade name), and the tan δ peak temperature was then measured under conditions including an actual measurement length of 25 mm, a strain of 0.5%, a frequency of 1 Hz, a measurement range of −70° C. to 50° C., and a temperature increasing rate of 3° C./min.

The tan δ peak temperature was a value obtained from a peak detected by automatic measurement using an RSI Orchestrator (manufactured by TA Instruments, trade name).

(3) Measurement of Number Average Molecular Weight, Weight Average Molecular Weight, Molecular Weight Distribution, and Coupling Ratio The number average molecular weight and weight average molecular weight of the hydrogenated block copolymer A were measured according to GPC measurement (apparatus: LC-10 (manufactured by Shimadzu Corporation, trade name), column: 2×TSKgel GMHXL (4.6 mm ID×30 cm), solvent: tetrahydrofuran), and they were each obtained as a molecular weight relative to polystyrene, using commercially available standard polystyrene. In addition, the molecular weight distribution of the hydrogenated block copolymer A was obtained as the ratio between the obtained weight average molecular weight and number average molecular weight. Moreover, the coupling ratio of the hydrogenated block copolymer A was obtained using the peak area before coupling and the peak area after coupling in the molecular weight distribution measured by GPC.

Furthermore, the number average molecular weight and weight average molecular weight of the polymer powder B were each obtained as a molecular weight relative to polystyrene, using commercially available standard polystyrene, according to GPC measurement (apparatus: HLC-8121 (Tosoh Corporation, trade name), column: 2×TSKgel GMHHR-H (20)HT (7.8 mm ID×30 cm), solvent: o-dichlorobenzene (DCB)). Further, the molecular weight distribution of the polymer powder B was obtained as the ratio between the obtained weight average molecular weight and number average molecular weight.

(4) Melt Flow Rate (Hereinafter Also Referred to as "MFR")
The MFR of the hydrogenated block copolymer A was measured in accordance with ASTM D1238, at 230° C. at a load of 2.16 Kg.

(5) Hardness (JIS-A) of Hydrogenated Block Copolymer A
In accordance with JIS K6253, year 2012 version, four sheets obtained in Examples 1 to 6 and Comparative Examples 1 to 17 were laminated on one another, and the hardness of the pellets of the hydrogenated block copolymer A was defined as the hardness of the hydrogenated block copolymer A, and an instantaneous value was measured using a durometer type A.

(6) Melting Point
The melting point of the polymer powder B was measured using a differential scanning calorimeter (DSC, MAC Science DSC3200S).

(7) Amount of Metal Residual
The amount of metal remaining in the polymer powder B was measured by elementary analysis using Inductivity coupled plasma (ICP) (manufactured by Shimadzu Corporation, ICPS-7510).

(8) Average Particle Diameter and Maximum Particle Diameter of the Antiblocking Agent of Polymer Powder B
The average particle diameter and maximum particle diameter of the antiblocking agent of polymer powder B were measured using a laser diffraction/scattering grain size distribution measuring apparatus (manufactured by Shimadzu Corporation, SALD-300V).

(9) Angle of Repose of the Antiblocking Agent of Polymer Powder B
The angle of repose of the antiblocking agent of polymer powder B was measured by an injection method in accordance with JIS R-9301-2, year 2012 version.

(10) Ash Content of the Polymer Powder B
The polymer powder B was added into a porcelain crucible, and was then weighed. Thereafter, it was cinerated at 750° C. for 6 hours in an electric furnace. The ash content of the polymer powder B was obtained according to the following calculation formula:

Ash content (%)=[Ash weight (g)/polymer powder B weight (g)]×100

(11) Amount of Oligomer in the Polymer Powder B

The amount of oligomer in the polymer powder B was obtained by extracting with a methanol solvent according to Soxhlet extraction, and then analyzing the obtained soluble portion of the polymer powder B according to GC/MS (Agilent Technologies 6890/5973MSD) and the measurement of the weight of the extract.

(12) Initial Tack Strength and Increasing Rate of Tack Strength after Aging (Evaluation of Tackiness Enhancing)

The surface protection film produced in each of the following Examples 1 to 6 and Comparative Examples 1 to 17 was allowed to adhere at a width of 25 mm to a polymethyl methacrylate plate (hereinafter also referred to as a "PMMA plate"). A 180° peel test was performed at a temperature of 23° C. on the PMMA plate immediately after adhesion of the surface protection film, and also on the PMMA plate, to which the surface protection film had been adhered and had been aged at 80° C. for 30 minutes.

As a measurement device used in the 180° peel test, a universal tension testing machine "Tensilon STM-T-200BP; manufactured by ORIENTEC CO., LTD." was used. In this 180° peel test, a tack strength was measured at a peeling rate of 300 mm/min. The increasing rate of the tack strength after aging was obtained according to the following formula:

Increasing rate of tack strength after aging=(Tack strength after aging)/(Initial tack strength)

(13) Anti-Surface Contamination Property

The surface protection film produced in each of the following Examples 1 to 6 and Comparative Examples 1 to 17 was allowed to adhere to a PMMA plate, and a rubber roll (diameter: 10 cm) with a weight of 1 kg was rolled on the PMMA plate at 23° C. at a relative humidity of 50%, so that the film was allowed to adhere thereto. Thereafter, the PMMA plate was left under a temperature condition of 23° C. for 7 days, or it was left under a temperature condition of 65° C. for 14 days. Thus, two types of measurement samples were produced. Thereafter, the surface protection film was peeled from each PMMA plate, the PMMA plate was then observed by visual inspection, and the anti-surface contamination property was evaluated based on the following evaluation standards.

◯: Clouded portions, which could be observed by visual inspection, could not be found in the peeled area.

Δ: Only a few clouded portions, which could be observed by visual inspection, could be found in the peeled area.

X: A large number of clouded portions, which could be observed by visual inspection, could be found in the peeled area.

(14) Method for Testing Release Property

The surface protection film produced in each of the following Examples 1 to 6 and Comparative Examples 1 to 17 was allowed to adhere at a width of 25 mm to a polypropylene plate. A 180° peel test was performed at a temperature of 23° C. on the polypropylene plate immediately after adhesion of the surface protection film, and also on the polypropylene plate, to which the surface protection film had been adhered and had been aged at 80° C. for 30 minutes.

As a measurement device used in the 180° peel test, a universal tension testing machine "Tensilon STM-T-200BP; manufactured by ORIENTEC CO., LTD." was used. In this 180° peel test, a tack strength was measured at a peeling rate of 300 mm/min. The release property was evaluated based on the increasing rate of the tack strength after aging, which was obtained according to the following formula. The smaller the value is, the more excellent the release property is.

Increasing rate of tack strength after aging=(Tack strength after aging)/(Initial tack strength)

[Used Materials]

The hydrogenated block copolymer A, the polymer powder B, the tackifier C, the thermoplastic elastomer D, and the thermoplastic resin E, which were used in the examples and the comparative examples, are as follows.

[Hydrogenated Block Copolymer A]

(Preparation of Hydrogenation Catalyst)

A hydrogenation catalyst used in the hydrogenation reaction of the hydrogenated block copolymer A was prepared by the following method. 1 L of cyclohexane, which had been dried and purified, was added into a nitrogen-substituted reaction vessel, and 100 mmol of bis(η5-cyclopentadienyl)titanium dichloride was then added thereto. While the obtained mixture was fully stirred, an n-hexane solution containing 200 mmol of trimethyl aluminum was added thereto. The thus obtained mixture was reacted at room temperature for approximately 3 days to obtain a hydrogenation catalyst.

(Preparation of Hydrogenated Block Copolymer A)

(A-1)

Using a stirring apparatus with an internal volume of 10 L and a tank reactor equipped with a jacket, batch polymerization was carried out. First, 1 L of cyclohexane was added to the reaction vessel. Then, 0.115 parts by mass of n-butyl lithium (hereinafter also referred to as "Bu-Li") was added based on 100 parts by mass of total monomers; 0.30 mol of N,N,N',N'-tetramethylethylenediamine (hereinafter also referred to as "TMEDA") was added based on 1 mol of Bu-Li. As a first step, a cyclohexane solution (concentration: 20% by mass) containing 9.5 parts by mass of styrene was added to the vessel over 10 minutes, and then, polymerization was carried out for further 10 minutes, wherein the temperature was controlled to 60° C. during the polymerization. Subsequently, as a second step, a cyclohexane solution (concentration: 20% by mass) containing 76 parts by mass of butadiene was added to the vessel over 60 minutes, and then, polymerization was carried out for further 10 minutes, wherein the temperature was controlled to 60° C. during the polymerization. Subsequently, as a third step, a cyclohexane solution (concentration: 20% by mass) containing 9.5 parts by mass of styrene was added to the vessel over 10 minutes, and then, polymerization was carried out for further 10 minutes, wherein the temperature was controlled to 60° C. during the polymerization. Finally, as a fourth step, a cyclohexane solution (concentration: 20% by mass) containing 5 parts by mass of butadiene was added to the vessel over 5 minutes, and then, polymerization was carried out for further 10 minutes. During the polymerization, the temperature was controlled to 60° C. to obtain a block copolymer.

With regard to the obtained block copolymer, the styrene content was 19% by mass, the vinyl bond content before hydrogenation was 36%, the weight average molecular weight was 111,500, and the molecular weight distribution was 1.05.

Subsequently, the above described hydrogenation catalyst, 100 ppm of titanium, was added to 100 parts by mass of the obtained block copolymer, and a hydrogenation reaction was then carried out under a hydrogen pressure of 0.7 MPa and at a temperature of 70° C. Thereafter, methanol was added to the reaction product, and 0.3 parts by mass of octadecyl-3-(3,5-di-t-butyl-4-hydroxyphenyl)propionate was added as a stabilizer to 100 parts by mass of the block polymer. The hydrogenation ratio of the obtained hydrogenated block copolymer (A-1) was 99%, and the MFR thereof was 13 g/10 minutes. The analysis results of the obtained hydrogenated block copolymer (A-1) are shown in Table 1.

(A-1-2)

A block copolymer was obtained by the same operations as those in the case of the hydrogenated block copolymer (A-1) with the exception that TMEDA was set at 0.25. With regard to the obtained block copolymer, the styrene content was 19% by mass, the vinyl bond content before hydrogenation was 30%, the weight average molecular weight was 110,000, and the molecular weight distribution was 1.04. In addition, the hydrogenation ratio of the obtained block copolymer was 99%, and the MFR thereof was 10 g/10 minutes. The analysis results of the obtained hydrogenated block copolymer (A-1-2) are shown in Table 1.

(A-2)

A hydrogenated block copolymer (A-2) was produced in the same manner as that in the case of the hydrogenated block copolymer (A-1). However, the amount of Bu-Li was set at 0.125 parts by mass based on 100 parts by mass of the whole monomers, and the amount of TMEDA was set at 0.28 moles based on 1 mole of Bu-Li. The amount of styrene used in the first and third steps was set at 5 parts by mass, and the amount of butadiene used in the second step was set at 83 parts by mass. With regard to the obtained hydrogenated block copolymer (A-2), the styrene content was 10% by mass, the vinyl bond content before hydrogenation was 35%, the weight average molecular weight was 100,500, and the molecular weight distribution was 1.04. In addition, the hydrogenation ratio of the obtained hydrogenated block copolymer (A-2) was 99%, and the MFR thereof was 9 g/10 minutes. The analysis results of the obtained hydrogenated block copolymer (A-2) are shown in Table 1.

(A-3)

A hydrogenated block copolymer (A-3) was produced in the same manner as that in the case of the hydrogenated block copolymer (A-2). However, the amount of Bu-Li was set at 0.130 parts by mass based on 100 parts by mass of the whole monomers, and the amount of TMEDA was set at 0.3 moles based on 1 mole of Bu-Li. The amount of styrene used in the first and third steps was set at 12.5 parts by mass, and the amount of butadiene used in the second step was set at 75 parts by mass. The fourth step was not performed. With regard to the obtained hydrogenated block copolymer (A-3), the styrene content was 25% by mass, the vinyl bond content before hydrogenation was 35%, the weight average molecular weight was 100,800, and the molecular weight distribution was 1.03. In addition, the hydrogenation ratio of the obtained hydrogenated block copolymer (A-3) was 99%, and the MFR thereof was 6 g/10 minutes. The analysis results of the obtained hydrogenated block copolymer (A-3) are shown in Table 1.

(A-4)

A hydrogenated block copolymer (A-4) was produced in the same manner as that in the case of the hydrogenated block copolymer (A-2). However, the amount of Bu-Li was set at 0.089 parts by mass based on 100 parts by mass of the whole monomers, the amount of TMEDA was set at 1.8 moles based on 1 mole of Bu-Li, and 0.04 moles of sodium t-pentoxide (hereinafter referred to as NaOAm) were added based on TMEDA. The amount of styrene was set at 22 parts by mass in the first and third steps, and the amount of butadiene was set at 51 parts by mass in the second step. With regard to the obtained block copolymer, the styrene content was 44% by mass, the vinyl bond content before hydrogenation was 78%, the weight average molecular weight was 99,000, and the molecular weight distribution was 1.05. In addition, the hydrogenation ratio of the obtained hydrogenated block copolymer (A-4) was 98%, and the MFR thereof was 3 g/10 minutes. The analysis results of the obtained hydrogenated block copolymer (A-4) are shown in Table 1.

(A-5)

A hydrogenated block copolymer (A-5) was produced in the same manner as that in the case of the hydrogenated block copolymer (A-2). However, the amount of Bu-Li was set at 0.111 parts by mass based on 100 parts by mass of the whole monomers, and the amount of TMEDA was set at 0.35 moles based on 1 mole of Bu-Li. The amount of styrene used in the first and third steps was set at 21 parts by mass, and the amount of butadiene used in the second step was set at 53 parts by mass. The fourth step was not performed. With regard to the obtained hydrogenated block copolymer (A-5), the styrene content was 42% by mass, the vinyl bond content in a butadiene block portion before hydrogenation was 36%, the weight average molecular weight was 87,600, and the molecular weight distribution was 1.04. In addition, the hydrogenation ratio of the obtained hydrogenated block copolymer (A-5) was 99%, and the MFR thereof was 0.7 g/10 minutes. The analysis results of the obtained hydrogenated block copolymer (A-5) are shown in Table 1.

TABLE 1

| | | A-1 | A-2 | A-3 | A-1-2 | A-4 | A-5 |
|---|---|---|---|---|---|---|---|
| Styrene content | (wt %) | 19 | 10 | 25 | 19 | 44 | 42 |
| Vinyl bond content of conjugated diene | (%) | 36 | 35 | 35 | 30 | 78 | 36 |
| Hydrogenation ratio of unsaturated bond | (%) | 99 | 99 | 99 | 99 | 98 | 99 |
| MFR | (g/10 min) | 13 | 9 | 6 | 10 | 3 | 0.7 |
| Hardness | (JIS A) | 67 | 40 | 80 | 68 | 96 | 99 |
| Tg | ° C. | −41 | −40.5 | −40.5 | −30 | −15 | −41 |

[Polymer Powder B (Antiblocking Agent)]

The used polymer powders (antiblocking agent) are shown in Table 2.

B-1: polyethylene-based powder (hereinafter also referred to as "PE"), average particle diameter: 4 μm (manufactured by Seishin Enterprise Co., Ltd.)

B-2: polyethylene-based powder, average particle diameter: 7 μm (manufactured by Seishin Enterprise Co., Ltd.)

B-3: polyethylene-based powder, average particle diameter: 17 μm (manufactured by Seishin Enterprise Co., Ltd.)

B-4: polyethylene-based powder, average particle diameter: 11 μm (manufactured by Seishin Enterprise Co., Ltd.)

B-5: polyethylene-based powder, average particle diameter: 25 μm (manufactured by Seishin Enterprise Co., Ltd.)

B-6: polypropylene powder (hereinafter also referred to as "PP"), average particle diameter: 18 μm (manufactured by Seishin Enterprise Co., Ltd.)

B-7: polypropylene powder, average particle diameter: 8 μm (manufactured by Seishin Enterprise Co., Ltd.)

B-8: calcium stearate (hereinafter also referred to as "Cast"), average particle diameter: 11 μm (manufactured by NOF CORPORATION)

B-9: ethylenebisstearylamide (hereinafter also referred to as "EBS"), average particle diameter: 18 μm (manufactured by NOF CORPORATION)

TABLE 2

|  |  | B-1 | B-2 | B-3 | B-4 | B-5 | B-6 | B-7 | B-8 | B-9 |
|---|---|---|---|---|---|---|---|---|---|---|
| Type |  | PE | PE | PE | PE | PE | PP | PP | Cast | EBS |
| Melting point | (° C.) | 121 | 126 | 105 | 115 | 105 | 160 | 145 | 156 | 145 |
| Metal residual amount | (ppm) | 3.7 | 18 | 0.8 | 81.5 | 0.8 | 119.3 | 35 | — | — |
| Number average molecular weight | (Mn) | 4500 | 2200 | 32000 | 16000 | 32000 | 4800 | 2500 | — | — |
| Average particle diameter | (μm) | 4 | 7 | 17 | 11 | 25 | 18 | 8 | 11 | 18 |
| Maximum particle diameter | (μm) | 13 | 22 | 61 | 44 | 87 | 64 | 28 | — | — |
| Angle of repose | (°) | 59 | 58 | 47 | 57 | 43 | 54 | 62 | — | — |
| Ash content | (wt %) | 0.002 | 0.007 | 0.001 | 0.01 | 0.001 | 0.012 | 0.009 | 9.5 | — |
| Oligomer amount | (wt %) | 0.12 | 0.17 | 0.023 | 0.33 | 0.023 | 0.22 | 0.35 | — | — |

[Tackifier C]

Alicyclic saturated hydrocarbon resin (manufactured by Arakawa Chemical Industries, Ltd., trade name: "ARKON P125")

[Thermoplastic Elastomer D]

Polyolefinic elastomer (manufactured by Mitsui Chemicals, Inc., "TAFMER DF640")

[Thermoplastic Resin E]

LDPE (manufactured by Japan Polyethylene Corporation, "Novatec LD LF443")

Examples 1 to 8 and Comparative Examples 1 to 17

Preparation of Hydrogenated Block Copolymer Pellets X1 to X17

Using a tumbler, the pellets of the hydrogenated block copolymer A were mixed with the powder of the polymer powder B at a mixing ratio shown in Table 3, so as to obtain hydrogenated block copolymer pellets X1 to X17.

(Preparation of Adhesive Resin Composition)

In addition, using the hydrogenated block copolymer pellets X2, 10, 11 and 16, individual components were mixed with one another with a composition shown in Table 3, so as to obtain individual adhesive resin compositions.

(Production of Surface Protection Film)

Using a two-layer film extruder (manufactured by RAND CASTLE), a surface protection film consisting of a base material layer and an adhesive layer was produced. As such a base material layer, PP (manufactured by SunAllomer Ltd., PC630A) was used, and as such an adhesive layer, any one of the hydrogenated block copolymer pellets X1 to X17 or each adhesive resin composition was used. The base material layer and the adhesive layer were subjected to co-extrusion molding, using a T die. The extrusion molding temperature was set at 200° C. for both of the base material layer and the adhesive layer. The thickness of the base material layer of the obtained surface protection film was 40 μm, and the thickness of the adhesive layer thereof was 15 μm.

With regard to the above obtained surface protection film, the initial tack strength, tack strength after aging (tackiness enhancing), anti-adherend surface contamination property at an ordinary temperature, anti-adherend surface contamination property after exposure to a high temperature, and release property were evaluated. The measurement results are shown in the following Tables 3 and 4.

TABLE 3

|  | Example | | | | Comparative Example | | | | | | | | | Example | | Comparative Example | |
|---|---|---|---|---|---|---|---|---|---|---|---|---|---|---|---|---|---|
|  | 1 | 2 | 3 | 4 | 1 | 2 | 3 | 4 | 5 | 6 | 7 | 8 | 9 | 5 | 6 | 10 | 11 |
| Hydrogenated block copolymer pellet X | X1 | X2 | X3 | X4 | X5 | X6 | X7 | X8 | X9 | X10 | X11 | X12 | X13 | X14 | X15 | X16 | X17 |
| Hydrogenated block copolymer A | A-1 | A-1 | A-1-2 | A-1 | A-1 | A-1 | A-1 | A-1 | A-1 | A-1 | A-1 | A-1 | A-1 | A-2 | A-3 | A-4 | A-5 |
| Polymer powder B | B-1 | B-2 | B-1 | B-1 | — | B-2 | B-3 | B-4 | B-5 | B-6 | B-7 | B-8 | B-9 | B-1 | B-1 | B-2 | B-2 |
| Additive amount of powder B | 0.5 | 0.5 | 0.5 | 0.35 | 0 | 1.8 | 0.5 | 0.5 | 0.5 | 0.5 | 0.5 | 0.5 | 0.5 | 0.5 | 0.5 | 0.5 | 0.5 |
| Initial tack strength (g/25 mm) | 320 | 320 | 315 | 325 | — | 300 | — | 295 | — | 275 | 290 | 320 | 320 | 350 | 270 | 80 | 90 |
| Increasing rate of tack strength after aging | 1.3 | 1.3 | 1.2 | 1.3 |  | 1.5 |  | 1.5 |  | 1.4 | 1.4 | 1.3 | 1.3 | 1.3 | 1.3 | 2 | 1.9 |
| Anti-surface contamination property (23° C., 7 days) | ○ | ○ | ○ | ○ |  | ○ |  | ○ |  | ○ | ○ | ○ | ○ | ○ | ○ | ○ | ○ |
| Anti-surface contamination property (65° C., 14 days) | ○ | ○ | ○ | ○ |  | ○ |  | ○ |  | Δ | Δ | X | X | ○ | ○ | Δ | Δ |
| Release property | 1.2 | 1.2 | 1.1 | 1.2 |  | 1.4 |  | 1.4 |  | 1.3 | 1.3 | 1.2 | 1.2 | 1.2 | 1.2 | 1.9 | 1.8 |

—: Not moldable due to blocking

TABLE 4

|  | Example | Comparative Example | | | Example | Comparative Example | | |
| --- | --- | --- | --- | --- | --- | --- | --- | --- |
|  | 7 | 12 | 13 | 14 | 8 | 15 | 16 | 17 |
| Hydrogenated block copolymer pellet X2 | 100 | 0 | 0 | 0 | 100 | 0 | 0 | 0 |
| Hydrogenated block copolymer pellet X10 | 0 | 100 | 0 | 0 | 0 | 100 | 0 | 0 |
| Hydrogenated block copolymer pellet X11 | 0 | 0 | 100 | 0 | 0 | 0 | 100 | 0 |
| Hydrogenated block copolymer pellet X16 | 0 | 0 | 0 | 100 | 0 | 0 | 0 | 100 |
| Tackifier | 10 | 10 | 10 | 10 | 10 | 10 | 10 | 10 |
| Thermoplastic elastomer | 30 | 30 | 30 | 30 | 0 | 0 | 0 | 0 |
| Thermoplastic resin | 0 | 0 | 0 | 0 | 15 | 15 | 15 | 15 |
| Initial tack strength (g/25 mm) | 310 | 310 | 305 | 120 | 305 | 304 | 305 | 100 |
| Increasing rate of tack strength after aging | 1.1 | 1.3 | 1.3 | 1.7 | 1.2 | 1.4 | 1.4 | 1.8 |
| Anti-surface contamination property (23° C., 7 days) | ○ | ○ | ○ | ○ | ○ | ○ | ○ | ○ |
| Anti-surface contamination property (65° C., 14 days) | ○ | X | X | Δ | ○ | X | X | Δ |
| Release property | 1.2 | 1.5 | 1.5 | 1.6 | 1.2 | 1.3 | 1.3 | 1.6 |

The present application is based on a Japanese patent application (Japanese Patent Application No. 2013-265994) filed to the Japan Patent Office on Dec. 24, 2013; the disclosure of which is hereby incorporated by reference.

INDUSTRIAL APPLICABILITY

The surface protection film of the present invention, which comprises an adhesive resin composition comprising the hydrogenated block copolymer pellets in an adhesive layer thereof, exhibits appropriately high tack strength to an adherend, has small tackiness enhancing, is excellent in film-release property after the film has been preserved in a roll state, and hardly contaminates the surface of the adherend even after it is exposed to high temperature conditions. Accordingly, the surface protection film of the present invention has industrial applicability for the purpose of surface protection of building materials, optical components, automobiles, daily necessaries, etc. Among others, the present surface protection film can be preferably used as a surface protection film for optical members, which are required to have anti-adherend contamination property.

The invention claimed is:

1. A hydrogenated block copolymer pellet comprising:
   100 parts by mass of a pellet molded product of hydrogenated block copolymer A and
   0.01 to 1.5 parts by mass of an antiblocking agent of polyethylene-based powder B, wherein
   the hydrogenated block copolymer A has a polymeric block a mainly comprising at least one vinyl aromatic monomer unit and polymeric block b mainly comprising at least one conjugated diene monomer unit, in which
   a total content of the 1,2-bond content and the 3,4-bond content in the hydrogenated block copolymer A before hydrogenation is less than 40 mol %, based on a total binding amount of the conjugated diene monomer unit,
   a content of the polymeric block a in the hydrogenated block copolymer A is 5% to 30% by mass,
   the polyethylene-based powder B has a number average molecular weight of 15,000 or less, and
   the antiblocking agent of polyethylene-based powder B have an average particle diameter of 1 to 15 μm.

2. A hydrogenated block copolymer pellet comprising:
   100 parts by mass of a pellet molded product of hydrogenated block copolymer A and
   0.01 to 1.5 parts by mass of an antiblocking agent of polyethylene-based powder B, wherein
   the hydrogenated block copolymer A has a polymeric block a mainly comprising at least one vinyl aromatic monomer unit and polymeric block b mainly comprising at least one conjugated diene monomer unit, in which
   the hydrogenated block copolymer A has a Tg of −30° C. to −45° C.,
   a content of the polymeric block a in the hydrogenated block copolymer A is 5% to 30% by mass,
   the polyethylene-based powder B has a number average molecular weight of 15,000 or less, and
   the antiblocking agent of polyethylene-based powder B have an average particle diameter of 1 to 15 μm.

3. The hydrogenated block copolymer pellet according to claim 1, wherein the hydrogenated block copolymer A has a hardness (JIS-A) of 30° to 80°.

4. The hydrogenated block copolymer pellet according to claim 1, wherein the antiblocking agent of polyethylene-based powder B have an angle of repose of 45° to 70°.

5. The hydrogenated block copolymer pellet according to claim 1, wherein the antiblocking agent of polyethylene-based powder B adhere to the surface of the pellet molded product of the hydrogenated block copolymer A.

6. The hydrogenated block copolymer pellet according to claim 1, wherein the polyethylene-based powder B has a melting point of 110° C. or higher.

7. The hydrogenated block copolymer pellet according to claim 1, wherein the hydrogenation ratio of an olefinic unsaturated double bond in the hydrogenated block copolymer A is 50 mol % or more.

8. The hydrogenated block copolymer pellet according to claim 1, wherein the vinyl aromatic monomer unit comprises a styrene unit, and the conjugated diene monomer unit comprises a butadiene unit.

9. The hydrogenated block copolymer pellet according to claim 1, wherein the content of the polymeric block a in the hydrogenated block copolymer A is 5% to 25% by mass.

10. The hydrogenated block copolymer pellet according to claim 1, wherein
the hydrogenated block copolymer A has the following 4-type structure: the polymeric block a—the polymeric block b (b1)—the polymeric block a—the polymeric block b (b2),
the content of the b2 is present in 0.5% to 9% by mass based on the total mass of the hydrogenated block copolymer A, and
the content of the b1 is larger than the content of the b2 by 50% by mass or more.

11. The hydrogenated block copolymer pellet according to claim 1, wherein the antiblocking agent of polyethylene-based powder B have the average particle diameter of 1 to 10 μm, and the antiblocking agent of polyethylene-based powder B have the angle of repose of 50° to 65°.

12. An adhesive resin composition comprising:
100 parts by mass of the hydrogenated block copolymer pellet according to claim 1, and
0 to 200 parts by mass of at least one polymer selected from the group consisting of a tackifier C, a thermoplastic elastomer D, and a thermoplastic resin E.

13. A surface protection film formed by laminating an adhesive layer comprising the adhesive resin composition according to claim 12 and a base material layer comprising a thermoplastic resin.

14. The hydrogenated block copolymer pellet according to claim 2, wherein the hydrogenated block copolymer A has a hardness (JIS-A) of 30° to 80°.

15. The hydrogenated block copolymer pellet according to claim 2, wherein the antiblocking agent of polyethylene-based powder B have an angle of repose of 45° to 70°.

16. The hydrogenated block copolymer pellet according to claim 2, wherein the antiblocking agent of polyethylene-based powder B adhere to the surface of the pellet molded product of the hydrogenated block copolymer A.

17. The hydrogenated block copolymer pellet according to claim 2, wherein the polyethylene-based powder B has a melting point of 110° C. or higher.

18. The hydrogenated block copolymer pellet according to claim 2, wherein the hydrogenation ratio of an olefinic unsaturated double bond in the hydrogenated block copolymer A is 50 mol % or more.

19. The hydrogenated block copolymer pellet according to claim 2, wherein the vinyl aromatic monomer unit comprises a styrene unit, and the conjugated diene monomer unit comprises a butadiene unit.

20. The hydrogenated block copolymer pellet according to claim 2, wherein the content of the polymeric block a in the hydrogenated block copolymer A is 5% to 25% by mass.

21. The hydrogenated block copolymer pellet according to claim 2, wherein
the hydrogenated block copolymer A has the following 4-type structure: the polymeric block a—the polymeric block b (b1)—the polymeric block a—the polymeric block b (b2),
the content of the b2 is present in 0.5% to 9% by mass based on the total mass of the hydrogenated block copolymer A, and
the content of the b1 is larger than the content of the b2 by 50% by mass or more.

22. The hydrogenated block copolymer pellet according to claim 2, wherein the antiblocking agent of polyethylene-based powder B have the average particle diameter of 1 to 10 μm, and the antiblocking agent of polyethylene-based powder B have the angle of repose of 50° to 65°.

23. An adhesive resin composition comprising:
100 parts by mass of the hydrogenated block copolymer pellet according to claim 2, and
0 to 200 parts by mass of at least one polymer selected from the group consisting of a tackifier C, a thermoplastic elastomer D, and a thermoplastic resin E.

* * * * *